Dec. 20, 1966    D. C. REILLY    3,292,771
MULTIPLE ROPE SUPPORTED CONVEYOR
Filed Feb. 11, 1964    2 Sheets-Sheet 1
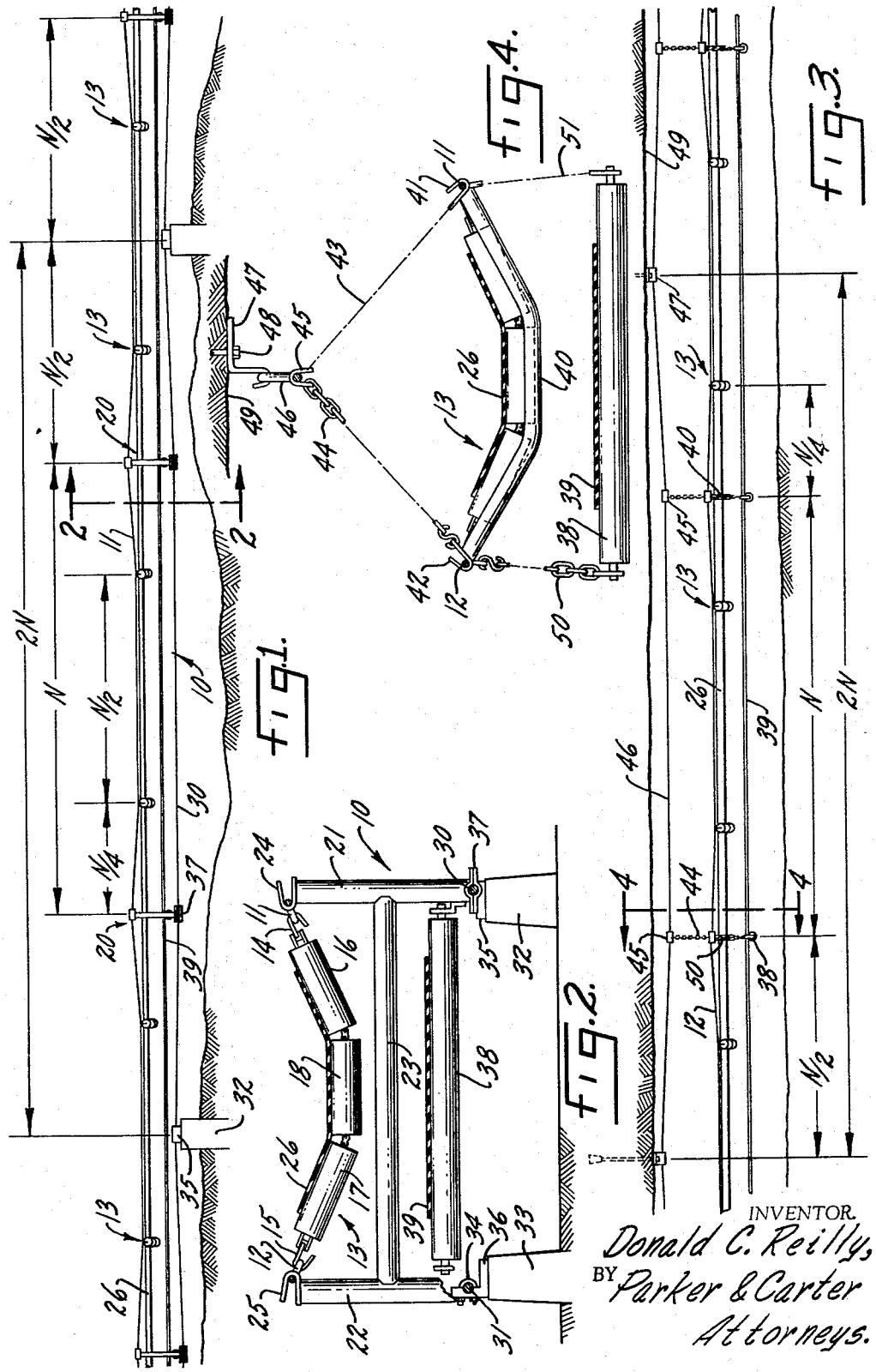
INVENTOR.
Donald C. Reilly,
BY Parker & Carter
Attorneys.

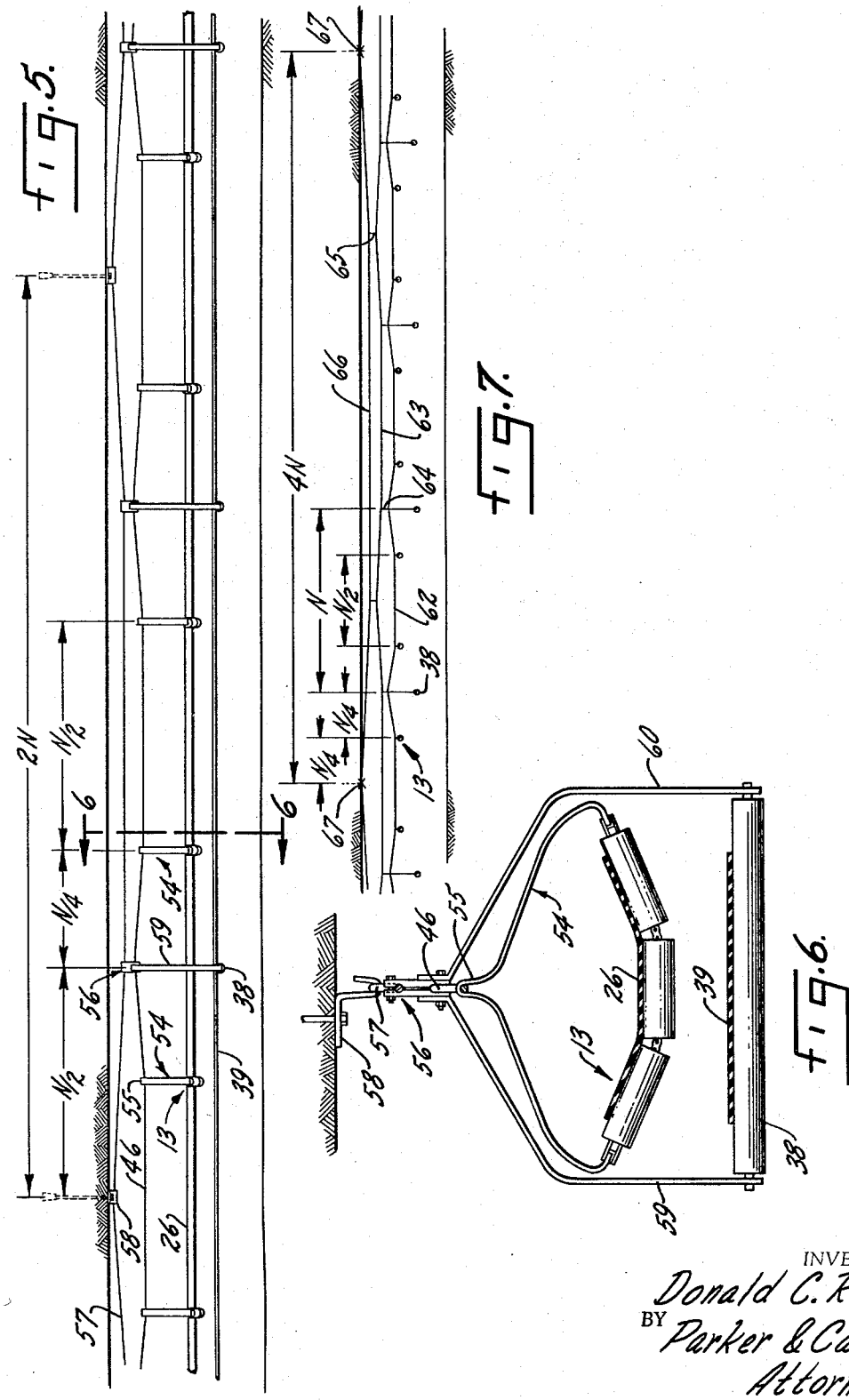

United States Patent Office 3,292,771
Patented Dec. 20, 1966

3,292,771
MULTIPLE ROPE SUPPORTED CONVEYOR
Donald C. Reilly, Downers Grove, Ill., assignor, by mesne assignments, to Westinghouse Air Brake Company, Pittsburgh, Pa., a corporation of Pennsylvania
Filed Feb. 11, 1964, Ser. No. 344,130
6 Claims. (Cl. 198—192)

This invention relates to conveyors whose sideframes are composed in whole or in part of flexible strands which are usually wire ropes. It specifically relates to a conveyor in which the level and deflection characteristics of the roller assemblies which support the flexible belt are maintained constant over successive rope spans, each of which may be of a substantially greater length than has heretofore been used in the industry.

Flexible strand conveyors of the general type illustrated in the Craggs et al. Patent 2,773,257 have come into widespread use in recent years. These conveyors generally employ flexible strand sideframes from which troughing roller assemblies are suspended. The roller assemblies in turn form a bed for the conveying reach of an orbitally movable endless flexible conveyor belt. The return reach of the belt is generally supported by suitable structure beneath the conveying reach. For a more detailed description of this type of conveyor reference may be made to the above-mentioned patent.

One of the foremost advantages of the flexible strand conveyor is its belt training ability. Since the individual roller assemblies which support the conveying reach may be minutely adjusted along the flexible strands, and since the individual rollers have some degree of 'give' with respect to their support points, roller assemblies may be quite accurately aligned for training purposes. Experience in the field however has shown that precise training relationships are not always established. Frequently, for example, a plurality of roller assemblies are positioned roughly, a conveying reach is then placed on them, and final roller assembly positioning is done by hand. If this final hand positioning is done when the conveyor belt is run loaded latent difficulties are not at once apparent because the weight of the loaded belt presses the belt into intimate contact with all rollers in each roller assembly, or at least the roller which provides the primary training effect. As those skilled in the art know each roller assembly may not be aligned exactly perpendicularly to the direction of belt travel. More often than not some are fairly precisely aligned and others are slightly misaligned. The belt will travel in a substantially centered position however because the effects of the misaligned roller assemblies tend to cancel one another out.

When an empty conveyor belt is run over a plurality of roller assemblies which have been properly positioned by hand when running loaded the belt may detrain badly. This is because good belt-roller contact may not be made between the belt and each roller assembly. If, for example, one roller assembly is spaced closer to a support point than its neighbor, the one roller assembly may make good belt-roller contact and the neighboring assembly none at all, so that the one roller assembly in effect forms a high spot in the belt. A number of high spots may have a cumulative tendency to detrain the belt in a given direction.

For these reasons it has been thought that the optimum belt training characteristics can be best achieved by the use of only two roller assemblies between adjacent pairs of flexible strand support points, and this is widely followed today.

The maintenance of the level path of travel for the conveying reach of the belt is also important from the standpoint of reducing wobbling and bobbing of the load carried on the belt. Wobbling refers to the tendency of the belt to change its troughing contour due to the stiffness of the vertically flexible roller assembly over which it passes. If a belt wobbles unduly, individual pieces of the load, such as large lumps of coal which are located near the teetering point may tumble off. Bobbing refers to the up-and-down movement of the load between roller assemblies. If there are long unsupported spans between roller assemblies, the catenary sag of the belt may be so great that the load runs downwardly a substantial distance and then must be lifted upwardly to pass over each roller assembly. This movement requires considerably more power than if an identical load travels the same longitudinal distance over a level path. For this reason it has been thought best by those skilled in the art to maintain the flexible strand spans between longitudinally adjacent ground support points at about 10 to 12 feet, and preferably about 10 feet. With a 10 foot span, and placement of roller assemblies every two and a half feet from each ground support point, a relatively level ride to the load has been provided.

Because of the above factors, the art today considers that a relatively short span between adjacent points of connection of the flexible strands to the ground support points must be provided.

Accordingly a primary object of this invention is to provide a flexible strand frame conveyor which is ground supported at intervals at least twice as great as customarily provided in conventional flexible strand frame conveyors.

Another object is to provide a conveyor as described immediately above in which the load will travel along a substantially level conveying path.

Another object is to provide a flexible strand conveyor which is ground-supported at distances at least four times greater than the distance between consecutive individual troughing idler assemblies, yet which conveyor carries a load in a level line.

Yet a further object is to provide a flexible strand conveyor which is ground-supported at intervals at least twice as great as the intervals customarily provided in conventional flexible strand conveyors and in which the training characteristics of the conveyor are equally as good as those prior art conveyors in which the shorter intervals are employed.

A further object is to provide a conveyor in which catenary droop between adjacent troughing idler assemblies is substantially eliminated to thereby maintain the troughing idler assemblies at the same level, yet enable the use of ground supports at relatively greater intervals, and therefore relatively fewer ground support structures.

Yet another object is to provide a flexible strand conveyor which is ground supported at intervals substantially greater than those intervals currently employed in which the no load as well as the full load training effects of the idlers are equally as good as those of conventional, properly installed conveyors.

Yet a further object is to provide a conveyor as above described in which all of the troughing idler assemblies are maintained in equally good contact with the conveying belt without the use of rigid spreader members of the type which merely maintain the gauge of the flexible strands.

Other objects and advantages of the invention will become apparent upon reading the following description of the invention.

The invention is illustrated more or less diagrammatically in the accompanying figures wherein:

FIGURE 1 is a side view of the flexible strand conveyor of the present invention installed on irregular, undulating terrain;

FIGURE 2 is a view taken substantially along the line 2—2 of FIGURE 1;

FIGURE 3 is a side view of a conveyor constructed in accordance with the principles of the present invention and supported from elevated locations;

FIGURE 4 is a view taken along the line 4—4 of FIGURE 3;

FIGURE 5 is a side view showing a variation of the invention;

FIGURE 6 is a view taken substantially along the line 6—6 of FIGURE 5; and

FIGURE 7 is a side view, schematic in nature, of yet another variation of the invention;

Like reference numerals will be used to refer to like parts throughout the following description of the drawings.

Referring first to FIGURE 1, the conveyor is indicated generally by the reference numeral 10. It includes a first pair of flexible strands 11 and 12 which may for example be wire rope of a diameter conventionally used in the art. The flexible strands form means for supporting a plurality of troughing roller assemblies 13 which are connected to and suspended from the strands by connectors 14, 15. The wire ropes may be forced into snug engagement with the connectors by a wedge or any other suitable means.

In this instance the troughing roller assembly is of the vertically flexible type and consists of a pair of wing rollers 16 and 17 flanking a center roller 18. The rollers are free to flex with respect to one another in a generally vertical plane by chain links similar to bicycle chain links connecting the ends of the roller shafts. The center roller 18 is often referred to as the primary training roller.

The flexible strands 11 and 12 are secured to supporting structures indicated generally at 20, the distance between each pair of longitudinally adjacent supporting structures being represented by the letter N. The supporting structures in this instance are generally H-shaped rigid stands consisting of a pair of generally upright tubular members 21, 22 which are maintained a fixed distance apart by a cross brace 23. A U-shaped saddle is welded or otherwise suitably secured to the upper end of each tubular upright, a pair being indicated at 24 and 25. Each saddle receives a flexible strand which is forced into engagement with the saddle by a wedge or any other suitable means not shown.

The conveying reach of an orbitally movable endless conveyor belt is indicated at 26.

As best seen in FIGURE 1, each troughing roller assembly 13 is spaced a distance of approximately N/4 from its nearest support structure, and the distance between longitudinally adjacent roller assemblies is approximately N/2. It will be understood that these spacings need not be established with extreme precision.

Another pair of flexible strands is indicated at 30 and 31. This pair of strands, which likewise will usually be wire ropes, are fixed to concrete footings 32, 33 by U-shaped double threaded bolts 34 which are received in L-shaped members 35, 36 which in turn are secured to the upper end of the footings.

The H-shaped stands or supporting structures 20 are secured to the second pair of flexible strands by split clamps 37, one-half of each clamp, in this instance, being shown as carried by the lower end of each tubular member 21 and 22. A return roller is indicated at 38, the ends of the return roller being received in brackets which are secured to the inside surface of tubular uprights 21 and 22. The return reach of the orbitally movable endless conveyor belt is indicated at 39.

It will be noted that the second pair of flexible sideframes are secured to the fixed support points 32, 33 a distance 2N apart. Further, the distance between each ground support point 32 and the nearest flexible strand sideframe supporting structure 20 is N/2.

The variation of the invention shown in FIGURES 3 and 4 employs, as in FIGURE 1, the first pair of flexible strands 11 and 12 from which the roller assemblies 13 are suspended. The strands are maintained a substantially constant distance apart by spreader members 40, the spreader members being essentially curved tubular members, each of which terminates in a rope saddle 41, 42 which receives a flexible strand. It will be understood that the flexible strands are not maintained an exact, uniform distance apart from end to end because the roller assemblies 13 are connected to the flexible strands at locations at which the strands are free to flex up and down and in and out with respect to the longitudinal axis of the conveyor.

One ear of each rope saddle 41, 42 is connected to the lower end of a supporting chain 43, 44, respectively. The upper end of each chain is connected to an inverted U-shaped saddle member 45 which is connected by any suitable means, not shown, to a single flexible strand 46. The flexible strand 46 is supported by a carrier member 47 which is secured as by bolt 48 to the roof 49. Suitable securing means may be used to secure the roof strand 46 to the U-shaped saddle portion of roof connector 47, or the flexible strand can be left free to move longitudinally to and fro with respect to the roof connector. A plurality of return roller assemblies 38 are suspended from the flexible strand sideframes 11 and 12. In this instance, the return rollers have been hung by chains 50, 51 directly from the saddle members 41, 42 to which the spreaders 40 are welded. It is quite within the scope of the invention however to place the return rollers at other locations, as for example, midway between the rollers 13.

As best seen in FIGURE 3, the distance between the adjacent ground support points is indicated as 2N; the distance between adjacent support locations on the flexible strand 46 from which the pair of strands 11 and 12 are supported is indicated as N, and each support location 45 is located a distance N/2 from the nearest ground support point 47. Each troughing idler assembly 13 is located a distance N/4 from either the closest support location 45 or support point 47.

It should be understood that the term "ground" as used in this specification and the appended claims is used in the context of referral to a fixed or ultimate support structure. That is to say, the term does not mean exclusively the surface of the earth or floor of an underground mining entry. It refers equally to an ultimate support point which may be located above the level of the supported conveyor, such as the roof 49 of an entry as illustrated in FIGURE 3.

Yet another embodiment is illustrated in FIGURES 5 and 6. In this instance, the troughing roller assembly 13 is supported by a flexible, tong-shaped supporting structure 54 which is secured, as at 55, to flexible strand 46. The two arms of the hanger are sufficiently resilient to enable the troughing contour of the belt to vary under changing load, yet sufficiently rigid to maintain the troughing roller assembly in substantially the illustrated position under no load conditions. Flexible strand 46 in turn is supported by a bolted, double-plate connector 56 from another flexible strand 57. Strand 57 in turn is supported from the ground, in this instance a mine roof, at a plurality of support points 58.

Return rollers 38 are suspended by hanger members from flexible strand 46, each hanger member, in this instance consisting of a pair of identical but inversely positioned arms 59, 60.

As best seen in FIGURE 5, each troughing roller assembly is spaced a distance N/2 from its neighboring troughing roller assemblies, and a distance N/4 from the closest support location 56. Strand 57 in turn is supported from a plurality of ground support points, each consecutive pair of points being a distance 2N apart. Each support point 58 is a distance N/2 from the closest support location 56.

The diagrammatic showing of a three rope series is illustrated in FIGURE 7. The troughing roller assemblies 13 are suspended from a first pair of flexible strands 62. Each pair of flexible strands, or its structural equivalent such as indicated at 43, 44, 45 and 40 in FIGURE 3, in turn is supported from succeeding flexible strand means 63 by supporting structure 64. Flexible strand means 63 is in turn supported by suitable suspender or connectors 65 from yet a succeeding flexible strand means 66. Strand means 66 is in turn connected to the ground, in this instance the roof of an underground mine passage, at a plurality of points 67. The spacing relationship of the individual components from one another is shown best from the diagrammatic relationship drawn above FIGURE 7.

It will be understood that any one or all of flexible strand means 62, 63 and 66 may be composed of either a single or multiple number of individual strands. Irrespective of whether a single or multiple number of strands is employed, the principles of the invention which have to do with the relative spacing of the conveyor components are applicable.

The use and operation of this invention is as follows:

The present invention employs at least two rope means. In a conveyor having only two rope means, one rope means carries the troughing idler assemblies and the other is supported directly from the ground. The rope means which carries the troughing idler assemblies is supported from the rope means which is supported directly from the ground. The term "supported" when used in this specification and the appended claims in reference to the relationship of one flexible strand or rope means to another is used in the context of a carrying of one rope frame or element by another rope frame or element. That is to say, the term is not confined to the relationship of the rope frames of FIGURE 3 in which ropes 11 and 12 are hung beneath rope 46. The term applies with equal application to the relationship of the rope frames of FIGURE 1 in which ropes 11 and 12 are located above, but still carried by ropes 30, 31.

It is also contemplated by the present invention that in certain applications the invention may take the form of primary, secondary and tertiary or even a greater number of flexible strand or rope means. For each additional flexible strand means arranged in series as disclosed herein, it is possible to increase the spacings between ground supports and still enable the load to be carried across the conveyor in a level condition.

Referring to the simplest and basic setup of FIGURES 1 through 4, the conveyor in each of FIGURES 1 and 3 is ground supported at distances at least four times the spacings between individual troughing idler assemblies, yet each conveyor carries the load in a level line. The distance 2N of FIGURE 1 is approximately twice the distance between ground supports presently considered practical in the art. Since the point of deflection of all points 37 below the level of a line passing through the tops of concrete footings 32 is equal from end to end of the conveyor (because each supporting structure 20 is spaced substantially a constant distance from its closest footing), the saddles 24, 25 of each stand will lie in the same plane from one end of the conveyor to the other. So long as the troughing roller assemblies 13 are spaced equidistantly on either side of supporting stands 20, their downward deflection due to the catenary droop of the ropes and the load will be identical so that the roller assemblies will be substantially aligned from one end of the conveyor to the other.

In the embodiment of FIGURES 3 and 4, a pair of flexible strands 30, 31 have in effect been replaced by a single flexible strand 46. This is feasible since the entire assembly is suspended from the flexible strand means which is secured to the ground.

In the embodiment of FIGURES 5 and 6, each of the two pairs of flexible strands of the FIGURE 1 embodiment have been replaced by a single strand. Thus strand 46 is functionally equivalent to flexible strands 11 and 12, and flexible strand 57 is substantially equivalent to flexible strands 30 and 31.

The spacing between consecutive ground support locations can be increased indefinitely. FIGURE 7 indicates that the spacing between adjacent ground support locations can be increased indefinitely all the while maintaining the troughing roller assemblies in a common plane. In this figure a third flexible strand means 66 has been employed. Thus it can be readily seen that by approximately doubling the distance between the support points or locations of each flexible strand means as contrasted to its immediately preceding flexible strand means the troughing roller assembly will be maintained at a constant level irrespective of the number of the flexible strand means employed.

The foregoing description of the invention is exemplary only. Various modifications may be made within the skill of the art, all of which are within the spirit and scope of the invention. Accordingly, the invention should not be limited by the foregoing description but, rather, only by the following claims when interpreted in light of the pertinent prior art.

I claim:

1. In a conveyor, the combination comprising
    a first rope frame means including at least one longitudinally extending rope,
    troughing idler assembly means carried by the first rope frame means,
    said troughing idler assembly means being connected to the first rope frame means at points of connection which are vertically movable,
    said troughing idler assembly means being arranged to support conveyor belt means,
    a second rope frame means including at least one longitudinally extending rope,
    means supporting the first rope frame means from the second rope frame means at points of connection which are vertically movable, and
    means connecting the second rope frame means to ground support points,
    the distance between adjacent ground support points being substantially 2N,
    the distance between adjacent suspension points of the first rope frame means being substantially N.

2. The conveyor of claim 1 further characterized in that
    the first rope frame means includes a pair of longitudinally extending ropes,
    said pair of ropes lying in the same nominal horizontal plane.

3. The conveyor of claim 1 further characterized in that
    the distance between each ground support point and the closest first rope frame means supporting point is substantially $N/2$.

4. The conveyor of claim 1 further characterized in that
    the distance between each first rope frame means supporting point and the closest troughing idler assembly is substantially $N/4$.

5. In a conveyor, the combination comprising
    a first rope frame means including at least one longitudinally extending rope,
    troughing idler assembly means carried by the first rope frame means,
    said troughing idler assembly means being connected to the first rope frame means at points of connection which are vertically movable,
    said troughing idler assembly means being arranged to support conveyor belt means,
    a second rope frame means,
    a third rope frame means,
    means supporting the first rope frame means from the second rope frame means at points of connection which are vertically movable, means supporting the second rope frame means from the third rope frame means at points of connection which are vertically movable, and means connecting the third rope frame means to ground support points, the distance between adjacent ground support points being substantially 4N, the distance between adjacent supporting points of the second rope frame means being substantially 2N, the distance between adjacent supporting points of the first rope frame means being substantially 1N.

6. A rope frame conveyor which provides a substantially level base for a flexible conveyor belt between ground spans of substantial length, said conveyor including first rope frame means, a plurality of roller assemblies supported from said first rope frame means at intervals therealong, a conveyor belt, said roller assemblies forming a base for the conveyor belt, and at least one additional rope frame means.

one of said additional rope frame means being ground supported, each of said rope frame means, except the one additional rope frame means, being supported from a preceding rope frame means at support locations which are vertically movable, the support spans defined by the distance between adjacent support locations of each preceding rope frame means being of greater length than the support span of each succeeding support span.

References Cited by the Examiner

UNITED STATES PATENTS 2,907,448   10/1959   Gleeson.
3,055,484   9/1962    Hubert _____ 198—129

EVON C. BLUNK, *Primary Examiner.*

R. J. HICKEY, *Assistant Examiner.*